Patented July 9, 1929.

1,720,406

UNITED STATES PATENT OFFICE.

HARRY M WEBER, OF MONTCLAIR, NEW JERSEY, ASSIGNOR TO ELLIS-FOSTER COMPANY, OF MONTCLAIR, NEW JERSEY, A CORPORATION OF NEW JERSEY.

PLASTICIZED MOLDING COMPOSITION AND PROCESS OF MAKING SAME.

No Drawing. Application filed December 17, 1924. Serial No. 756,549.

This invention relates to the preparation of molding compositions and the process of making same. In the preparation of molding compositions suitable for use in the preparation of so-called hot molded articles great care must be exercised in the preparation of the resinous constituent of such compositions to prevent the reaction from progressing to too great an extent which would interfere greatly in the molding operations and in some cases necessitate the discarding of any molding composition prepared therefrom. As a result of the great care required, the tendency has been to carry out the preparation of the resin in such a manner that the reaction does not go to completion and consequently as the raw materials which are used for the preparation of the resin are ordinarily water soluble, some valuable material is carried away on separating the resin from the aqueous layer and can only be recovered at an excessive cost. By means of the present invention it is possible to carry the reaction of the raw materials in the preparation of the resin to such a point that the reaction is practically carried to completion thereby increasing the resulting yields and reducing the cost. I have found that compounds of hexamethylenetetramine such for example as hexamethylenetetramine-triphenol or tri-xylenol and the like act as softening or fluxing agents on these resins under heat and pressure and that the addition of these compounds to the prematurely-reacted or so-called "overcured" molding compositions will cause a fluxing or plasticizing effect causing the resin present in the composition to flow to a greater extent resulting in a molded article having an improved surface.

I prepared hexamethylenetetramine-triphenol from 48 parts of hexamethylenetetramine and 94 parts of phenol, which were dissolved in a dilute alcohol made up of 60 parts of ethyl alcohol and 40 parts of water and the solution heated to boiling under a reflux condenser until the materials had reacted to form the desired compound. On cooling the resulting alcoholic solution of hexamethylenetetramine-triphenol crystallization of this compound occurred and the crystals were subsequently filtered off. On distillation or evaporation of the mother liquor a second crop of crystals were obtained. The crude hexamethylenetetramine-triphenol from the first crystallization may be used as obtained but in some cases it is desirable to re-crystallize the product from hot alcohol in order to obtain a pure product. In the majority of cases however this is not necessary. I call attention to the fact that the compounds of hexamethylenetetramine with phenols, used herein, are non-resinous bodies, usually crystalline in character.

The fluxing or plasticizing compound may be incorporated with the molding composition in any appropriate manner. In the following example the effect of this agent on the resin itself without the addition of any filler is given.

100 parts of phenol and 100 parts of formaldehyde, 40 per cent solution, and 12.5 parts of concentrated ammonia were heated to boiling in a suitable vessel under reflux condenser until the resinous product had become a rubbery semi-solid mass. The aqueous solution was separated from the resulting resin, the resin allowed to cool and then broken up and crushed to a fine powder. On molding this resin at 160° C. under 1000 pounds pressure it was found that the resin had very little flow in that the full pressure of 1000 pounds could be applied within 30 seconds after closing the mold without extrusion of the resin. At the end of 5 minutes' time of cure the resinous article was removed from the mold and found to be opaque and had only a fair surface. 2 parts of hexamethylenetetramine-triphenol was added to 10 parts of the powdered resin and molded under similar conditions. It was found that it was not possible to apply the full 1000 pounds pressure to the closed mold without causing the resin to extrude from the mold until the resin had been subjected for a period of a minute and a half to slight pressure at 160° C. The full pressure then was applied without loss of resin by extrusion. After allowing the resin to cure for 5 minutes the resulting molded article was found to be translucent and exhibited a good lustrous surface of a very desirable character. The contrast in the two products, with and without the hexamethylenetetramine triphenol was very marked.

As another example of the fluxing and plasticizing effect of these compounds upon a resin without filler the following is given.

A molding composition was prepared as follows: 122 parts of crude coal tar acid, 50 per cent boiling between 200 and 212° C., the remaining 50 per cent boiling between 212 and 220° C., was reacted with 100 parts of formaldehyde in the presence of 20 parts of calcined magnesium oxide (the formaldehyde solution and magnesium oxide were first mixed and ground in pebble mill until the resulting mixture was of a creamy consistency). The mixture of tar acid, formaldehyde and magnesium oxide was heated under reflux condenser for a period of 30 minutes at 50° C. At the end of this time the temperature of the solution was gradually brought up to boiling. The resulting resin was then separated as much as possible from the aqueous solution and the resin dried in vacuum dryer with temperature gradually raised to 105° C. On hot-pressing some of the resin it was found that the resin did not flow and that the full pressure could be applied to the mold as soon as it was closed. The resulting molded article after 3 minutes cure was found to have a dull surface, was opaque and fractured on removal from the mold. 1 part of hexamethylenetetramine-triphenol was added to 10 parts of the powdered resin and molded under similar conditions. It was not possible to apply full pressure to the mold, until the resin had been subjected to heat for 1 minute, without squeezing a considerable amount of resin from the mold. After curing the resinous material for 3 minutes the resulting molded article was found to be translucent, had a bright surface. That is, the composition gave every indication of having sufficient flow for use in molding. Here again with a totally different type of resin the plasticizing effect of triphenol compound is observed.

The finish of a molded article and the filling of the interstices of a mold with composition is dependent on the flow of the resin and this property can most readily be determined and measured by molding the resin itself without filler. The quantity of the resin extruded along the crevices of the mold and the time required to cause the resin to set under a slight pressure afford a rough practical means of measuring this property of the resin. In the foregoing examples it was observed that (without adding the fluxing agent) the resin set so rapidly that the full pressure could be applied immediately or within 30 seconds of the time of closing the mold, and as noted the finish was dull and the flow negligible. The addition of the plasticizer remedied this defect.

As an example of the effect of the fluxing action of these bodies on a composition containing filler which was in the so-called "overcured" state, the following example is given.

A small quantity of a commercial molding composition known as bakelite 420 was heated on the hot plate until the resin had reacted and become converted to a state which any molder would describe as worthless for use in molding, by methods heretofore generally used. On attempting to mold some of this heat-treated composition it was found that the resulting mass had practically no flow. The surface of the specimen was dull and mottled showing every indication of being prematurely-cured. To 25 parts of the heat-treated composition 2 parts of hexamethylenetetramine-xylenol were added by dissolving this plasticizing agent in alcohol, moistening the heat-treated powder with the resulting solution, evaporating in a vacuum dryer to remove solvent and molding the dried powder. The powder was molded under the same conditions as the original heat-treated compound, namely 1000 pounds pressure at about 160° C. In the presence of the plasticizing agent entirely different results were obtained. The resulting molded article had a surprisingly bright glossy surface, did not show any evidence of the composition having been prematurely-cured and gave every indication of having a good flow. The "worthless" material was thus rehabilitated.

The employment of hexamethylenetetramine-phenol, cresol, xylenol and of corresponding compounds of polyhydric phenols, compounds of naphthols and the like of similar or analogous fluxing and plasticizing action on resins of all types, including shellac and other natural resins, urea-formaldehyde, acetone-formaldehyde and other synthetic resins, falls within the scope of the present invention.

The term, "thermo-setting" as used herein, as in the prior art, means that the resinous material is one that hardens or sets and becomes infusible (or far less fusible than in its earlier condition) by heating in the mold during hot-pressing.

I do not claim herein, the use of the fluxing agents with resins in which the reactions have progressed to the stage of giving wholly infusible resins, which are by themselves incapable of softening somewhat by heat. Such latter resins would not be capable of being fluxed by the treatment described herein.

What I claim is:—

1. In the process of making molding compositions of the resin and filler type, the step which comprises adding to such composition containing a resin which is overcured although capable of sticking together when subjected to hot molding conditions, a small proportion of a hexamethylene-tetramine-phenol as a plasticizing agent.

2. A molding composition comprising a resin which is overcured although capable of sticking together when subjected to hot molding conditions, a filler and a few per cent of an added crystalline hexamethylene-tetramine-phenol as a plasticizing agent.

3. A molding composition comprising a resin of insufficient fusibility, a filler and a small proportion of an added hexamethylenetetramine-triphenol acting as a fluxing agent for such resin.

4. A molding composition comprising a resin which by itself is not of sufficient fusibility to produce on hot molding, a clean cut molded article of good finish, together with a fluxing agent therefor, consisting of a fusible compound of a phenolic body with hexamethylene-tetramine.

5. A process which comprises molding a composition comprising a resin which by itself is not of sufficient fusibility to produce on hot molding, a clean cut molded article of good finish, together with a fluxing agent consisting of a fusible compound of a phenolic body with hexamethylene-tetramine.

6. A molding composition comprising an over-cured resin and a smaller amount of fusible compound comprising the reaction product of a phenolic body and hexamethylene-tetramine, the latter being capable of fluxing the over-cured resin sufficiently to produce good hot molding.

7. A molding composition comprising an over-cured synthetic resin selected from the class consisting of phenol-, acetone- and urea-formaldehyde resins together with a smaller amount of a fusible non-resinous compound of a phenolic body and hexamethylene-tetramine, the latter being capable of fluxing the over-cured resin sufficiently to produce good hot molding.

8. In the art of molding resinous condensation products, the step of adding a non-resinous hexamethylene-tetramine-phenol compound to an over-cured resinous condensation product in amount sufficient to serve as a fluxing agent for the latter during hot molding, whereby the flowing quality of the latter is substantially increased.

9. In the art of molding resinous condensation products, the step of adding a non-resinous hexamethylene-tetramine-phenol compound to an over-cured resinous condensation product of a phenolic body with formaldehyde, in amount sufficient to serve as a fluxing agent for the latter during hot molding, whereby the flowing quality of the latter is substantially increased.

HARRY M. WEBER.